Nov. 30, 1965
W. B. HARGRAVE
3,220,505
AUDIOMETRIC HEADSET
Filed April 1, 1964
3 Sheets-Sheet 1
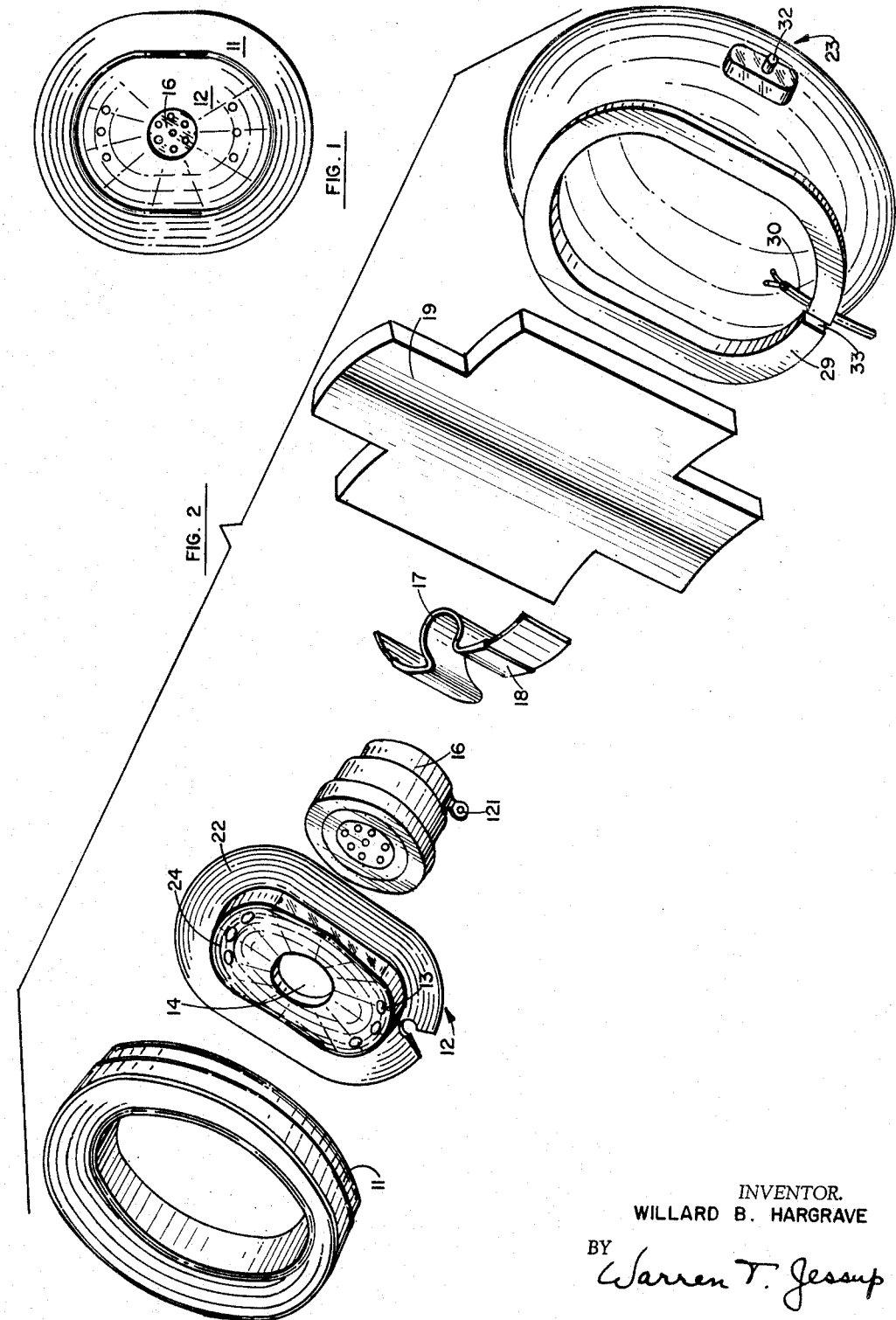
INVENTOR.
WILLARD B. HARGRAVE
BY Warren T. Jessup
ATTORNEY Nov. 30, 1965    W. B. HARGRAVE    3,220,505
AUDIOMETRIC HEADSET
Filed April 1, 1964    3 Sheets-Sheet 2
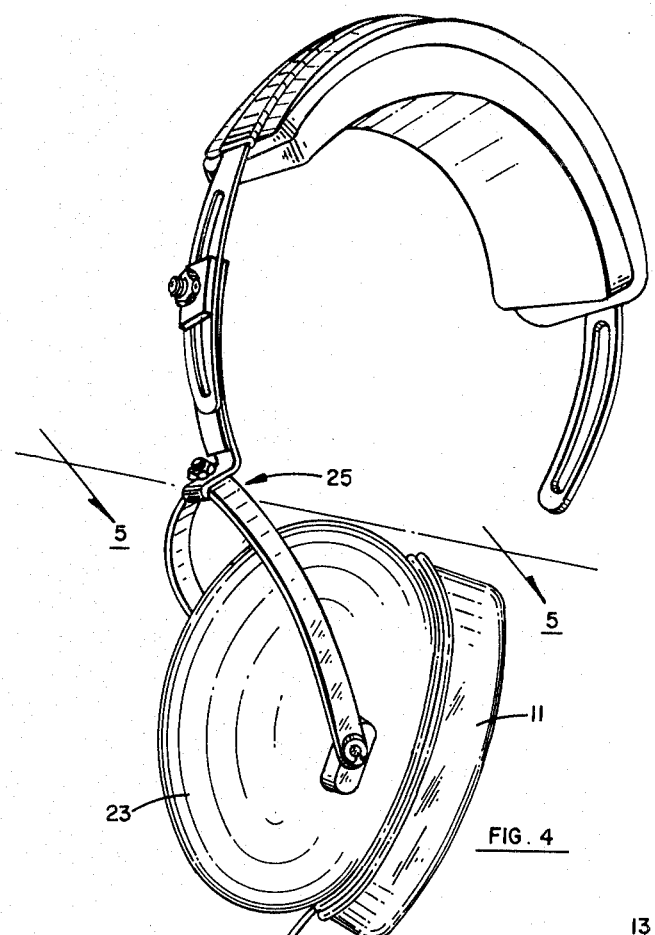
FIG. 4
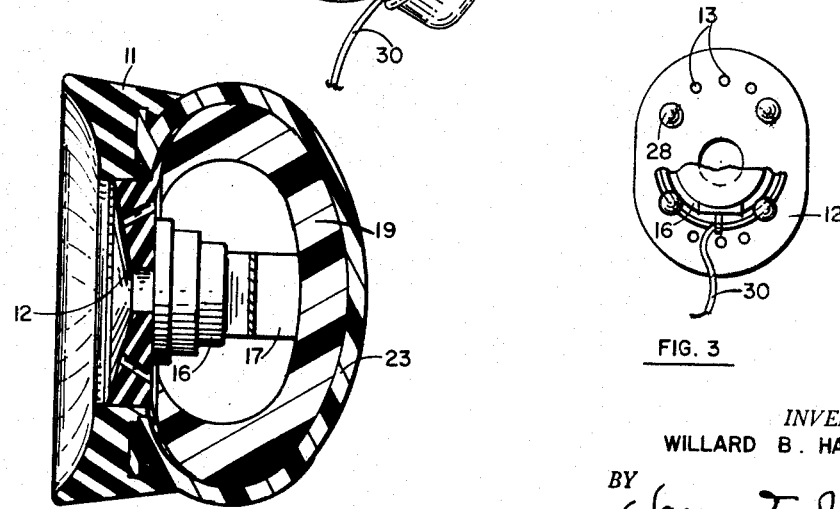
FIG. 5
FIG. 3
INVENTOR.
WILLARD B. HARGRAVE
BY
Warren T. Jessup
ATTORNEY

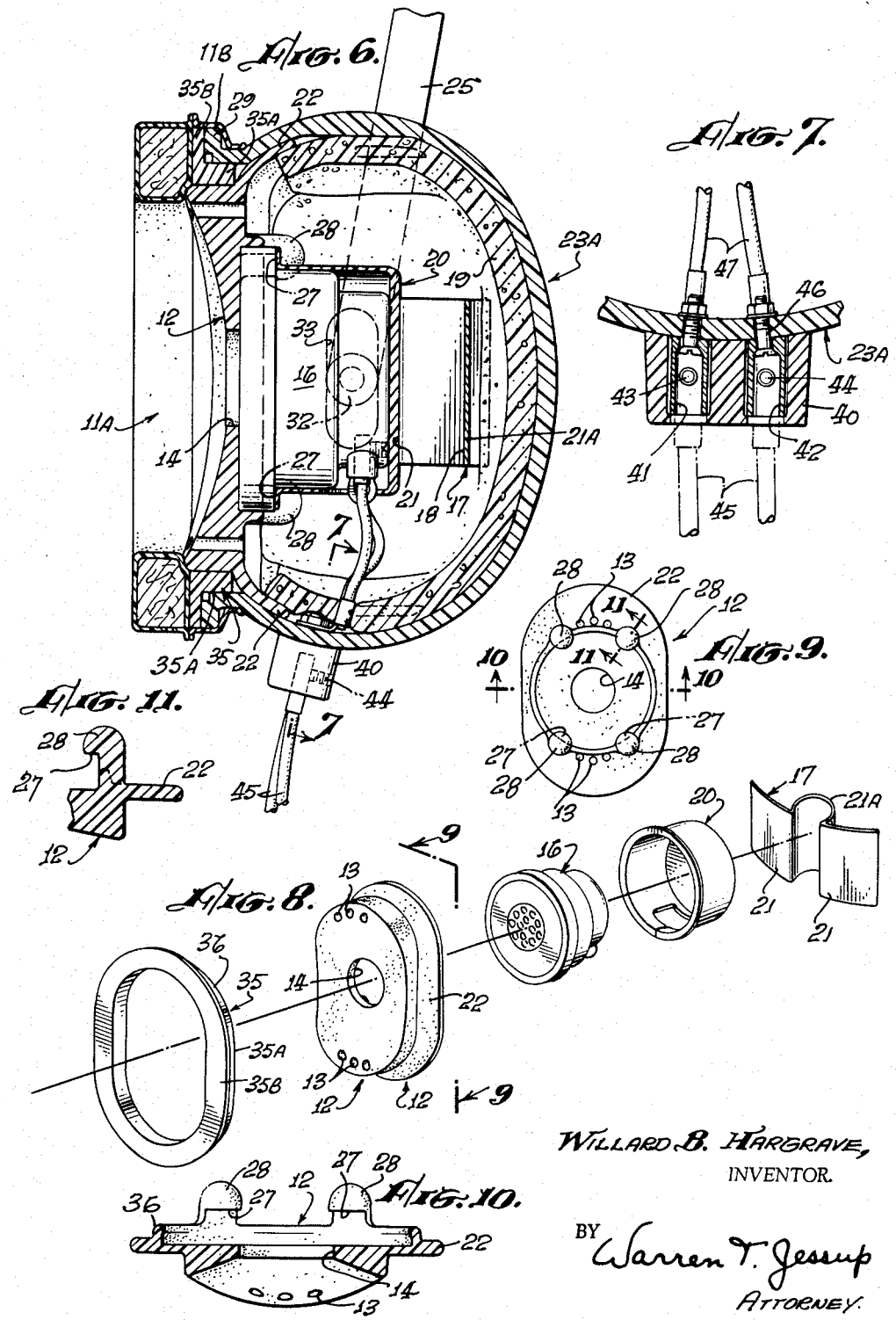

United States Patent Office 3,220,505
Patented Nov. 30, 1965

3,220,505
AUDIOMETRIC HEADSET
Willard B. Hargrave, 5739 Camilia Ave.,
Temple City, Calif.
Filed Apr. 1, 1964, Ser. No. 356,676
7 Claims. (Cl. 181—23)

This application is a continuation-in-part of U.S. patent application, Serial No. 137,076, for Audiometric Headset, filed September 11, 1961 now abandoned.

This invention relates to an audiometric headset and more particularly to such a headset which can be used in making tests in the presence of ambient noise.

It is essential in making accurate hearing tests that the sound signals arriving at the eardrum be closely controlled. Therefore, to insure the accuracy of such tests, a very quiet space such as a soundproof booth is generally utilized. This greatly adds to the expense involved in setting up testing facilities and necessarily limits the number of patients that can be tested simultaneously, that is, in a group.

The device of this invention provides means for enabling accurate hearing measurements under conditions of reasonable ambient noise level without resorting to a soundproof space. This end result is achieved by means of an audiometric headset comprising an audiometrically adapted sound transducer mounted in a specially adapted sound blocking case. The headset is adapted for easy assembly and disassembly without the use of any special tools.

It is therefore an object of this invention to provide an improved audiometric headset.

It is a further object of this invention to enable accurate hearing measurements under conditions of ambient noise.

It is another object of this invention to provide an audiometric headset adapted to block out ambient sound.

It is a still further object of this invention to provide an audiometric headset of simple construction which can readily be assembled and disassembled without special tools.

More specifically, it is an object of this invention to provide a cooperative assembly of a sound barrier dome with an accurately calibrated audiometric sound producing apparatus in such manner that the sound producing apparatus resides within the dome in an interfitted and replaceable manner without need for securing devices separate from the members themselves.

In this respect, this invention provides a retrofit structure.

"Retrofit" is a term of art employed to indicate that one component, or group, may be fitted into, or associated with another, in place of original components.

As used herein, this term indicates that the operative components may be fitted into a dome as illustrated, which is widely used as communication equipment.

Further, it is used to indicate that the parts may be replaced in the field, without tools, and that perfect calibration results without delay which would otherwise be required to return the equipment to a laboratory for calibration.

A still further specific object of this invention is to provide a coupler cushion which, when pressed tightly to the human external ear, will flatten and fill the folds of the auricle, and form a chamber therewith of about six cubic centimeters regardless of the size or age of the person, within prescribed testing tolerances.

It is a still further object of this invention to provide a unique spring base for the speaker of an audiometric device housed within a dome, providing a broad seating base resilient to direct central pressure, resistant to off-center pressure yielding beyond a prescribed limit, and having a stop-limit action to all movement into the dome.

Yet another object of this invention is to provide a new and unique electrical lead into a sound barrier dome.

Other objects of this invention will become apparent from the following description taken in connection with the accompanying drawings, in which FIG. 1 is a plan view of a preferred embodiment of the device of the invention;

FIG. 2 is an exploded view of the embodiment shown in FIG. 1;

FIG. 3 is a plan view with partial cutaway section of the earphone and audiometric coupler of the preferred embodiment of the device of the invention;

FIG. 4 is a perspective view of the preferred embodiment of the device of the invention mounted in a headband;

FIG. 5 is a cross-sectional view of the embodiment shown in FIG. 4 taken along a plane indicated by the line 5—5 in FIG. 4;

FIG. 6 is a vertical section taken through a modified version of the audio testing device and sound barrier combination;

FIG. 7 is a section taken along line 7—7 of FIG. 6;

FIG. 8 is an exploded perspective view of the retrofit audio testing equipment, the unique spring means used to provide support within the dome, and the snap-ring used to clamp the assembly in the dome;

FIGURE 9 is a rear elevation of the coupler cushion pad of the parts of FIG. 8;

FIG. 10 is a section through line 10—10 of FIG. 9; and

FIG. 11 is a detail taken along line 11—11 of FIG. 9.

Referring to the drawings, with special attention to FIG. 2, case 23 is dome shaped and has an open end. Case 23 is lined with a sound filter 19 fabricated of a resilient sound proofing material. For ease of fabrication, sound filter 19 may comprise a cross-shaped piece as shown in FIG. 2 which has been cut out of a sheet of material. As shown in FIG. 5, filter 19 is readily folded and inserted into case 23 to form a liner there for. A resilient plastic foam material such as polyurethane may be used for filter 19. Sound transducer means 16 which is generally an earphone is removably attached to audiometric coupling means 12 by means of four holders 28 formed in the back surface of the coupling means (see FIGS. 3 and 11). As indicated in FIGS. 3 and 11, holders 28 are small hook-shaped tabs having hook shoulders which grab the rim of the earphone. Hook shoulders are indicated by reference number 27.

The earphone 16 and in turn the audiometric coupling means 12 are urged towards the open end of case 23 by leaf spring 17. Spring 17 urges coupling means 12 against the auricle of the ear with sufficient tension to assure the same distance between earphone 16 and the eardrum with auricles of different sizes and shapes. In the assembled unit, the ends of leaf spring 17 become imbedded in resilient filter 19 and the central portions of the spring resiliently push against the back of earphone 16. Spring 17 is adapted so that it will limit the travel of the earphone and coupling means into case 23 to prevent malfunction of the unit under normal usage. In FIG. 2 the portions of spring 17 which normally contact the earphone are electrically insulated by an appropriate tape or insulating coating 18 to prevent the shorting out of electrical terminals 121 of the earphone which receive the input signals from wire leads 30. In FIG. 8 an insulator cup 20 houses the earphone to provide a low friction contact and to insulate the terminals.

The audiometric coupler 12 may be fabricated of a resilient material such as sponge rubber. Coupler 12 has a circumferential flange portion 22 which abuts against and is contiguous with the inner wall of dome shaped case 23 adjacent the open end thereof. The flange portion, as indicated in FIG. 5, is resiliently pressed against the wall of the dome, and is overlayed by the ends of filter 19. Flange portion 22 provides means for holding earphone 16 within the dome against the spring action of spring 17. Coupler 12 also has a raised portion 24 which is oval shaped and has a dish like contour. Raised portion 24 is also contoured so that the rim at the ends of the oval at the major axis has about twice the thickness of the central part thereof at the minor axis. The exact contour of raised portion 24 is determined for the desired audiometer calibration in accordance with techniques well known in the art. Raised portion 24 may be circular to produce a round coupler 12.

A circular aperture 14 is formed in the center of audiometric coupler 12. Six small holes 13 are formed along the ends of oval shaped raised portion 24. These holes are used to acoustically couple the chamber 16 with the interior of the dome in order to prevent resonance and distortion. Their position and size are determined in accordance with standard acoustical techniques.

Earmuff 11 is removably attached to a lip 29 formed in the edge of case 23. Earmuff may be fabricated of soft sponge rubber to provide a soft cushion for the ear. Earmuff 11 may, if so desired, be integrally formed with raised portion 24 of coupler 12 and this one piece cemented to flange portion 22.

Referring to FIGURE 4, headband 25, which is of conventional design, is attached to case 23 by means of pins 32 on opposite sides of case 23.

Electrical sound signals are conveyed to earphone 16 by means of wire leads 30 which are brought through slot 33 formed in case 23 and connected to terminals 121.

The device of the invention can be readily assembled and disassembled without the use of any special tools. No screws or threaded pieces are required. This greatly facilitates both manufacture and repair of the headset.

The device of the invention is adapted for use with standard audiometers without changing the calibration of the earphone output. It can be readily retrofitted to most audiometers using standard audiometric receivers. In accordance with standard audiometric practice, for proper calibration, the air space between aperture 14 in coupler 12 and the eardrum of the testee should be 6 cubic centimeters. Under such conditions and with a coupler 12 having the standard audiometric contour, the audiometer can be readily calibrated without removal of the earphone from the dome.

The device of this invention thus provides a simple yet highly efficient means for enabling accurate audiometric tests under conditions of ambient noise.

As thus far described, the invention sets forth an audiometric headset which generally comprises a coupler cushion 12 of resilient material, such as sponge rubber, to cooperate with the auricle portion of an average human ear and form a sound pressure chamber therewith.

The coupler cushion 12 has a central opening or aperture 14. The purpose for this opening is that an audio transducer, illustrated in the form of an earphone 16, bridges over the central opening on the side of the cushion 12 opposite the chamber which is formed by the cushion pressing against the human ear.

The audio transducer 16 is held on the backside of the coupler cushion by means of four posts or holders 28, each of which has a modified stem to produce a hook shoulder 27, thus enabling the earphone audio transducer 16 to be held against the backside of the coupler cushion by a resilient restraining device.

As a separate instrumentality, a dome means, which is popularly referred to as an ear defender, is employed to keep out ambient noise in order that the properly fitted coupler cushion and audio transducer may not have to be operated within a dome large enough to hold the entire patient. That is, a room is not needed.

The dome means 23 has an open end to fit against the head of the user and encase the ear of the user to form a sealed sound barrier. The coupler cushion is fitted at the open end of the dome to contact the auricle of the ear which is encased by the dome 23.

However, the dome is a separate instrumentality from the audiometric testing apparatus in the sense that the position of the coupler cushion is, as it must be in audiometric testing, separate from the position of the enclosing dome. Conversely stated, the coupler cushion is free to fit onto the auricle of the ear of the user and compensate for thickness and shape of the ear without causing a corresponding position change of the ear defender dome, and yet maintaining a tight fit of the coupler cushion to the ear.

It is emphasized that this invention differs from conventional communication devices in that communication devices merely hold out noise in order that a spoken word from an audiospeaker may be understood by the person wearing the communication device. This invention strives to provide a coupler pressing against the auricle of the ear with a constant pressure, being able to retract and shift position according to each individual ear. The position and pressures of the cushion is not dependent upon the contact of the case with the head of the wearer surrounding the ear.

To accomplish this end, spring 17 is provided in the form of an arch. This spring, seated within the dome, has two arcuate portions 21 separated by a gap at the apex of the arch. This gap is bridged by a loop convolution 21A joining said two arcuate portions 21.

This spring 17 is thereby yieldable in the direction of the loop 21A by the function of said two portions 21 closing toward one another to close the gap between them.

The loop 21A serves as a yieldable connector between the two portions 21. The transducer earphone 16 seats upon the two arcuate portions 21, over said gap. Therefore, the spring is able to act upon the transducer in the direction of the sound pressure chamber produced with the ear. Conversely, the transducer is able to push downwardly toward the spring until the spring reaches a maximum limit of movement, by contact of the portions 21 with one another, or by contact of the loop 21A with the surface of the case.

The coupler cushion pad 12 is provided with a circumferential flange 22. The main body of the coupler 12 is thick and shaped to fit the particular opening of the dome with which it is to cooperate. Thus, in the illustration, the thick pad is oblong.

The flange 22 underlays the dome structure surrounding the entrance opening into the dome. Then, the sound filter pad 19, which is preferably formed as illustrated in FIG. 2, in the general shape of a cross, is formed into the dome and substantially lines the entire interior of the dome. In this manner, the sound filter 19 overlays the flange 22.

In operation, the flange 22 acts as a flexible interconnecting device to seal between the thick portion of the coupler and the dome regardless of the position dictated by the opposing force of the spring 17 and outside forces pressing against the pad. In operation, the outside forces would normally be the counter pressure of the ear being tested. Thus, the coupler 12 is free to move into and out of the mouth portion of the protecting dome, but complete freedom of the dome to move as needed is maintained at all times.

Audiometry is an exact science insofar as the precision of the audiometers is concerned, and any deviation in means whereby there is more or less amplitude of a given frequency at the ear drum of the person being tested than is indicated on the audiometer amplitude dial, leads to error.

There are three major factors in at-the-ear attenuators for audiometrics, whereas there is only one for communication earphones. In the communication field, the amount of the attenuation is the only important factor. Calibration accuracy and retrofit are not in any way involved. Communications devices are never calibrated; earphones either work or they don't work. However, the phones of audiometers are calibrated to audiometers at the time of manufacture and must be periodically recalibrated to adjust any deviation from their precision setting.

A mere communication earphone encased in a dome ear defender could be used in audiometrics if precision calibration is completely ignored, but the result would be that a hearing test made with such a device would be totally unacceptable. Audiograms are a part of diagnosis, both medically and educationally, as to cause of deafness. An inaccurate audiogram would, if not known to be inaccurate, lead to erroneous and improper treatment. The illustrated embodiment of invention by reason of the independent suspension of the audiometric system from the defender system, together with a proper coupling of the two members to seal the chamber produced, will provide calibration which is off of ideal calibration at a maximum of 0.80 decibels minus, at 250 cps. At other frequencies the calibration error is even less. The ASA allows 1½ db, plus or minus.

Further, the purpose of the spring 17 is important to understand. Communication model devices hold the earphone in position by many convenient means, one widely used means being the provision of a pad of artificial sponge or foam material. This material will provide resiliency for a short period of time, but is well known to take a "set" after a period of time and cease to produce a resiliency. As stated herein, the accurate calibration and fitting of the coupler 12 to all ears requires not only complete resiliency, but an ability to tip for adaption to various ear structures, and to provide a limit of movement in order to avoid disrupting the continuity of the coupler pad with the dome.

In the use of this type of audiometric device, which does not require a sound proof room, there are two separate pressures to consider: the head band pressure to hold the headset firmly against the head so that the seal will keep out noise which would otherwise seep through at the point of contact, and the pressure of the coupler 12 to a slightly lesser degree for holding the coupler 12 against the auricle of the ear as headbands are employed to hold the received to the ear whenever ear defender muffs are not employed.

The need for audiometer enclosures (booths) and at-the-ear attenuators is just as great for audiometers now in use as for audiometers not yet manufactured, and it is important, second only to calibration, that an at-the-ear attenuator would be easily and quickly assembled to the audiometer in the field, thus eliminating necessity that the audiometer be shipped to some laboratory for assembly. This invention provides the means whereby the audiometer earphone may be assembled into an ear defender dome with the complete assurance that once installed in a few minutes, the calibration will be as accurate as it was before installing as part of the present invention, if not more so. Prior devices have required that the entire audiometer and earphone be returned to the factory for proper calibration.

A second embodiment of the invention employing useful improvements is illustrated in the FIGURES 6 through 10. The dome 23a is substantially identical to the dome shown in the FIGURE 2, but lacks the massive and specially formed earmuff 11. Note how earmuff 11 in FIGURE 5 anchors onto the lip 29 and fills in around the coupler cushion 12 to center and hold the cushion.

In the embodiment shown in FIGURE 6, a snap ring 35 provides a barrel portion 35A and a lip ring 35B. Although it is somewhat difficult to form the massive earmuff 11 to fill the space around the coupler cushion 12 in order to position the cushion 12 accurately, it is possible with greater ease, by means of die casting and molding procedures, to produce a snap ring 35 of accurate dimensions. Hence, the barrel 35A fits into the mouth opening of the dome 23, and the lip portion 35B will seat upon the lip 29 of the case 23 and thus limit the projection of the barrel portion 35A into the case.

When the coupler cushion 12 is placed in the dome, the column action from the spring 17 through the transducer earphone 16 against the coupler cushion will tend to force it back out of the case. Only the relatively thin flange 22 seeks to abut the dome wall and resist this force. Hence, by filling the space between the case 23 and the exterior wall of the thickened portion of the coupler 12, a holding action is provided in an area where the coupler cushion is strong. This strong point is at the union of the flange 22 to the thick portion. Thus, this barrel 35A, being accurately formed in length dimension, will act as an accurate positioning device to establish the initial position of the coupler cushion with respect to the mouth of the case 23. It may be said that the coupler cushion 12 is therefore micrometrically positioned, because the length of the barrel portion 35A may be ground to such close tolerances that the dimension must be measured with a micrometer.

Then, a new and improved muff 11A is employed to provide the comfort factor normally provided by the massive muff 11. The muff 11A is provided with a depending resilient skirt 11B which is adapted to cling to the lip 29 and hold the muff is position.

Therefore, as this embodiment is placed against the head of a user, the reaction pressure of the ear will cause the coupler cushion 12 to retract and move inwardly with respect to the barrel portion 35A, and then return outwardly when the coupler is removed from the head of the patient. This action may be analogized to the action of a piston operating within a cylinder.

Also, the rear face of the coupler 12 is altered in that a retainer ledge 36 is formed to center the receiver. See FIGURE 11 for an illustration of the hook nature of the holders 28 having shoulders 27 which are employed to engage the flange of the cup 20. Note that in FIGURE 2 the spring is insulated by means of plastic 18, but that in the embodiment shown in FIGURES 6 through 8, plastic cup 20 provides a housing and protects the electrical connections, as well as providing a smooth plastic surface. This surface is somewhat like a lubricated surface in effect. Thus, the spring can act without any appreciable frictional drag.

Also, a new and improved electrical inlet box 40 provides two sockets 41 and 42. A set screw 43, operating in socket 41 and the set screw 44 operating in socket 42 is used to anchor the connector ends of lead wires 45 from an audiometer.

The body of the box 40 is anchored to the dome by means of screws 46 which both anchor the box 40 and provide through conductor leads from the sockets 41 and 42. Internal lead wires 47 then continue from the screws 46 and connect to the sound transducer 16. Thus, the slot 33 which was needed in the rim 29 is eliminated from the embodiment of FIGURE 6.

While the instant invention has been shown and described herein in what is conceived to be the most practical and preferred embodiments, it is recognized that departures may be made therefrom within the scope of the invention which is therefore not be limited to the details disclosed herein but is to be afforded the full scope of the invention as hereinafter claimed.

What is claimed is:

1. An audiometric headset comprising a case having an open end, sound filter means fabricated of a resilient sound proofing material lining the inner walls of said case, sound transducer means, an audiometric coupler pad means having a circumferential flange, one surface of said flange being contiguous with the portion of the inner wall of said case adjacent the open end thereof, the surface opposite said one surface of said flange being contiguous with said filter means, said coupler means including holder means removably holding said transducer means, and spring means urging said sound transducer means towards the open end of said case, said spring means being of leaf spring construction seated against said dome and supplying a broad platform urging said transducer toward said open end of the case, and thereby supporting said transducer with a degree of independence with respect to the position of the dome;

whereby the dome will seat upon the wearer and the pad and transducer will rock into a reaction position upon the ear of the wearer.

2. An audiometric headset comprising, a sound transducer, a dome shaped case having an open end, sound filter means fabricated of resilient material lining the inner walls of said case, audiometric coupling means mounted within said case across the open end thereof, said coupling means having a central opening, said coupling means having a disc-like shape and including a raised edge portion, flange means fixedly attached to said coupling means along the outer circumference thereof, said flange means being positioned between the inner walls of said case and said sound filter means, the edge portion of said coupling means having a thickness substantially greater than that of the center thereof;

spring means contiguous with said sound filter means urging said transducer towards the open end of said case, said transducer being attached to said coupling means and aligned with said central opening thereof, said spring means being of leaf spring construction seated against said dome and supplying a broad platform urging said transducer toward said open end of the case, and thereby supporting said transducer with a degree of independence with respect to the position of the dome, and means for coupling electrical signals to said sound transducer, whereby the dome will seat upon the wearer and the pad and transducer will rock into a reaction position upon the ear of the wearer.

3. An audiometric headset comprising:

an oval coupler cushion of resilient material having a bowl shape, wherein the cushion is thickest at the end areas to thereby conform to the auricle portion of an average human ear and form a sound pressure chamber therewith;

said coupler cushion having a central through opening, an audio transducer bridging over said central opening on the side of said cushion opposite said chamber, and positioned to direct sound energy through said opening;

dome means to enclose the cushion and transducer and form with the head of a user a sealed sound barrier, said dome means having an open end, sound filter means of resilient sound damping material lining the inner walls of said dome, said coupler cushion having a circumferential flange contiguous with the portions of the inner wall of said dome adjacent the open end thereof, said flange positioned between the dome walls and said lining to hold the cushion as a closure of said open end;

a plurality of through openings radially spaced from said central opening of the coupler cushion beyond said transducer to couple the sound pressure chamber acoustically to the interior of the dome; and a leaf spring having a resilient characteristic of substantially permanent nature and seated against said dome lining, said spring having a peak convolution providing a rockable platform base, said spring bridging between said dome means and said transducer to apply a force in the direction of said sound pressure chamber and thereby supply a column effect from said dome to said coupler cushion which is a function of the ear size and formation of the head of the user, and reacts in alignment to the ear of the user independently of the dome means.

4. An audiometric headset comprising a sound transducer, a dome shaped case having an open end, a snap ring having a barrel portion fitted to said open end and having a platform face overlaying the edge of the open end;

sound filter means fabricated of resilient material lining the inner walls of said case, audiometric coupling means mounted within said snap ring across the open end thereof, said coupling means having a central opening, flange means fixedly attached to said coupling means along the outer circumference thereof, said flange means being positioned between the inner walls of said case and said sound filter means, spring means contiguous with said sound filter means urging said transducer out of the open end of said case, said transducer being attached to said coupling means and aligned with said central opening thereof, said spring means being of leaf spring construction seated against said dome and supplying a broad platform urging said transducer toward said open end of the case, and thereby supporting said transducer with a degree of independence with respect to the position of the dome; and means for coupling electrical signals to said sound transducer, whereby the dome will seat upon the wearer and the pad and transducer will rock into a reaction position upon the ear of the wearer.

5. An audiometric headset comprising:

a coupler cushion of resilient material to cooperate with the auricle portion of an average human ear and form a sound pressure chamber therewith;

said coupler cushion having a central through opening, an audio transducer bridging over said central opening on the side of said cushion opposite said chamber;

dome means having an open end to fit against the head of a user and encase the ear to form a sealed sound barrier, said cushion positioned at said open end to contact the auricle of an ear encased by said dome means;

a spring in the form of an arch seated within said dome, said spring having two arcuate portions separated by a gap at the apex of said arch, said gap bridged by a loop convolution joining said two portions, said spring yieldable in the direction of said loop convolution by the function of said two portions closing toward one another to close said gap, said loop serving as a yieldable connector between said two portions, said transducer and spring contacting in said spring apex area to apply a force in the direction of said sound pressure chamber.

6. An audiometric headset comprising:

a sound transducer;

a dome shaped case having an open end;

a snap ring having a barrel portion fitted to said open end and having a platform face overlaying the edge of the open end;

a muff ring of resilient material dimensioned to seat upon said platform face ring as a comfort device to the wearer, said muff ring having a skirt portion of elastic nature depending from the muff and engaging the said platform face ring;

sound filter means fabricated of resilient material lining the inner walls of said case;

audiometric coupling means mounted within said snap ring across the open end thereof, said coupling means having a central opening, flange means fixedly attached to said coupling means along the outer circumference thereof, said flange means being positioned between the inner walls of said case and said sound filter means;

spring means in said case urging said transducer towards the open end of said case, said transducer being seated against said coupling means and aligned with said central opening thereof;

an electrical attachment body having a plurality of recess cavities opening outwardly of the body and adapted to receive wire-end couplers, means to clamp wire-end couplers in said recesses, one screw for each recess cavity extending through the wall of said case and through said coupler body into said recess cavity, and a lead wire from each screw interiorly of the case to the transducer.

7. An audiometric headset comprising:

an oval coupler cushion of resilient material having a bowl shape, wherein the cushion has a central opening and is thicker in the areas removed from the central opening to thereby conform to the auricle portion of an average human ear and form a sound pressure chamber therewith;

an audio transducer bridging over said central opening on the side of said cushion opposite said chamber, and positioned to direct sound energy through said opening;

dome means to enclose the cushion and transducer and form with the head of a user a sealed sound barrier, said dome means having an open end, said coupler cushion having a circumferential flange contiguous with the portions of the inner wall of said dome adjacent the open end thereof, said flange providing a shiftable seal between the dome walls and said cushion to act as a closure of said open end in all positions of said cushion;

resilient platform means urging said transducer in a direction out of the open end of said case, said coupler cushion together with said transducer being retractable and tiltable to accommodate the ear of a user being tested, said resilient platform means bridging between said dome means and said transducer to apply a force in the direction of said sound pressure chamber and thereby supply a column effect from said dome to said coupler cushion which is a function of the ear size and formation of the head of the user, and reacts in alignment to the ear of the user independently of the dome means.

References Cited by the Examiner

UNITED STATES PATENTS

| | | | |
|---|---|---|---|
| 2,856,469 | 10/1958 | Morse | 181—23 X |
| 2,989,598 | 6/1961 | Touger et al. | |
| 3,021,526 | 2/1962 | Lastnik | 181—23 X |
| 3,051,961 | 9/1962 | Clark | 181—23 X |
| 3,112,005 | 11/1963 | Shaw et al. | 181—23 |

LEO SMILOW, *Primary Examiner.*

LEYLAND M. MARTIN, *Examiner.*